March 15, 1932. S. S. RO 1,849,955
T-SQUARE AND GAUGE
Filed Oct. 23, 1929
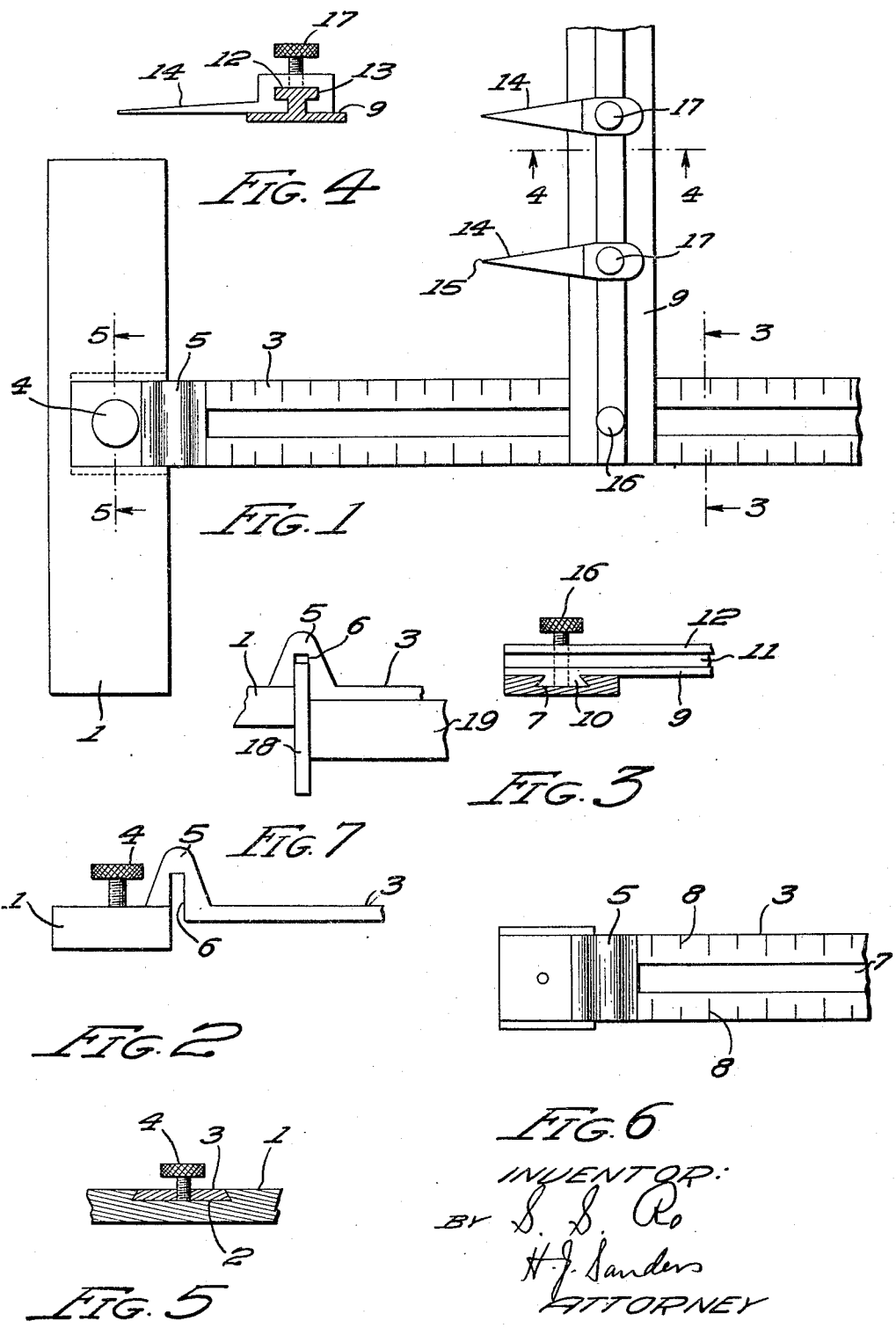

Patented Mar. 15, 1932

1,849,955

UNITED STATES PATENT OFFICE

SIGVART SALVESIN RO, OF BROOKLYN, NEW YORK

T-SQUARE AND GAUGE

Application filed October 23, 1929. Serial No. 401,706.

This invention relates to improvements in combination T-squares and gauges of a type for use particularly for measuring door locks and then transferring such measurements to the doors and jambs to be fitted with the locks to permit the same to be marked off accurately to facilitate application of the locks.

With the foregoing and other objects in view the invention consists in the combination and arrangement of parts to be hereinafter fully described, pointed out in the claim and illustrated in the accompanying drawings which forms a part of this application for patent and in which—

Fig. 1 is a top plan view of the T-square and gauge, one end thereof being broken away.

Fig. 2 is a fragmentary view of Fig. 1 in side elevation.

Fig. 3 is a cross sectional view on line 3—3 of Fig. 1.

Fig. 4 is a similar view on line 4—4 of Fig. 1.

Fig. 5 is a cross sectional view taken on line 5—5 of Fig. 1.

Fig. 6 is a fragmentary plan view of Fig. 1 clearly showing the formation of the upper end of the stem of the device detached from the crosshead.

Fig. 7 is a fragmentary view of Fig. 2 illustrating one application of the device.

Like reference characters denote corresponding parts throughout the several views.

In mortising doors for door locks it is necessary to take certain measurements of the lock casing and transfer the same to the door so that it can be marked accurately. The doors are marked for key holes, for door knob shanks etc. and measurements therefor are required. It is the purpose of the present invention to take and lay off such measurements to permit the work to be done accurately.

The device comprises a cross head to which a stem is secured, disposed at right angles thereto, said stem being formed with a humped portion formed with a cavity and with a longitudinally extending recess to permit its sliding engagement with a laterally extending arm provided with adjustable pointers or indicators. The reference numeral 1 denotes the crosshead formed with a recess 2 to receive one end of the stem 3 which is secured thereto by the set screw 4, said stem being formed, contiguous to the head, with the hump 5 formed with the recess 6 disposed at right angles to the head.

The stem is formed, further with the centrally disposed longitudinally extending recess or mortise 7 and marked off along its lateral edges with the graduations 8 in inches and fractions thereof. An arm 9 formed with a tenon 10 received in the said mortise 7 extends laterally from said stem at right angles thereto and is, by said tenon, slidably secured thereto; said arm being formed also with the centrally disposed longitudinally extending rib 11 having the lateral flanges 12 received in a slot 13 formed in each of the indicators 14 whereby the same are slidably secured to said arm, each of said indicators being formed with one pointed extremity 15.

The device is adapted for use as a T-square in the usual manner in various classes of work, as a measuring rule, as a marking tool and as a gauge. The arm 9 may be secured in adjusted position upon the stem 3 by means of the set screw 16 and each of the indicators may be anchored upon the arm 9 by means of its screw 17. Work may be measured along the arm 9 by means of the indicators and these measurements transferred to paper etc. Many lock cases have flanges 18 which makes it difficult to apply a gage thereto. In such cases the recess 6 in the hump 5 of the stem will receive the lock flange thus facilitating the application of the instrument to the lock casing 19.

What is claimed is:—

In a gauge for measuring flanged lock casings, a crosshead, a stem secured thereto and formed with a recessed humped portion to receive the lock flange and with a longitudinally extending recessed portion, an arm formed with a tenon slidably fitted in said longitudinal recess, a rib formed longitudinally of said arm, and indicators adjustably arranged upon said rib.

In testimony that I claim the foregoing as my own I have hereto affixed my signature.

SIGVART SALVESIN RO.